No. 734,296. PATENTED JULY 21, 1903.
C. BÜRGER.
TIRE.
APPLICATION FILED DEC. 15, 1902.
NO MODEL.
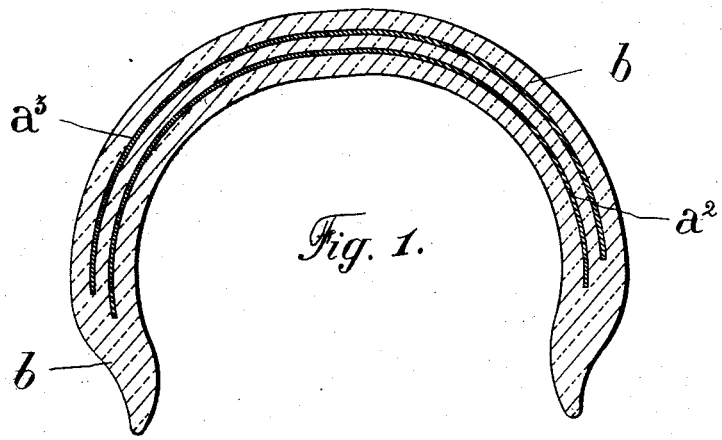
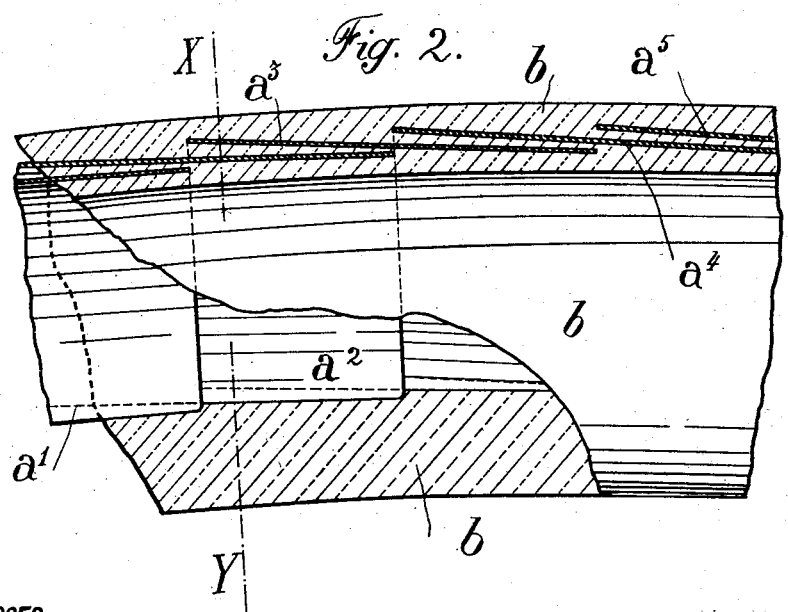

No. 734,296. Patented July 21, 1903.

UNITED STATES PATENT OFFICE.

CHARLES BÜRGER, OF CHÊNE-BOUGERIES, NEAR GENEVA, SWITZERLAND.

TIRE.

SPECIFICATION forming part of Letters Patent No. 734,296, dated July 21, 1903.

Application filed December 15, 1902. Serial No. 135,173. (No model.)

*To all whom it may concern:*

Be it known that I, CHARLES BÜRGER, engineer, a citizen of the Republic of Switzerland, and a resident of Chêne-Bougeries, near Geneva, Switzerland, have invented certain new and useful Improvements in and Relating to Tires, of which the following is a specification.

The invention consists of certain new and useful improvements in tires, and especially in the outer coating or casing intended to protect the air-chamber of a pneumatic tire, and consisting in a new combination of metallic and rubber portions with a view of obtaining the desirable imperviousness and resiliency. I am aware that the same ends have been sought by forming the tire of different combinations of metallic and rubber portions—for instance, by winding metal spirally and incasing the shell so formed in an elastic covering or by combining a plurality of independent abutting sections of spring metal covered by an independent outer cover or coating of rubber; but none of these attempts have proved to be satisfactory, and tires constructed in the said manner have been abandoned.

My present invention consists of the combination of a plurality of arc-shaped shells of semicylindrical or approximately semicylindrical curvature of spring metal, preferably tempered steel, placed all around the coating or casing intended to cover the air-chamber of a tire, the said shells overlapping each other and being incorporated in a circular shell of rubber or of a combination of rubber and fabric.

The accompanying drawings show, by way of example, one construction of my improved tire or tire-protecting cover.

Figure 1 is a cross-section through X Y of Fig. 2; and Fig. 2 is a longitudinal section of a tire having a portion of the rubber withdrawn, so as to show the metallic overlapping shells.

In the drawings, $a'$ $a^2$ $a^3$ $a^4$, &c., are semicylindrical metallic shells which overlap each other, as shown, and $b$ is the rubber forming the body of the coating or casing.

The metallic shells $a$ may vary in diameter and in length, and they may be arranged to overlap each other more or less than it is shown in the drawings without departing from the scope of the present invention. They will preferably be arranged in the manner shown in the drawings, so as to have each radial section made through the coating or casing to contain at least two concentrical cylindrical shells of spring metal.

The tire-cover constructed as described above may be provided with any suitable means whatever for the connection of the same with the felly of the wheel or with the air-chamber of the pneumatic tire.

Having thus fully described my invention, I claim—

1. A pneumatic tire, comprising an outer coating or casing of rubber, or rubber and fabric, and a plurality of shells of spring metal incorporated in said rubber, overlapping but not touching each other, substantially as set forth.

2. A pneumatic tire, comprising an outer coating or casing of rubber or rubber and fabric, and a plurality of arc-shaped shells of spring metal incorporated in said coating overlapping but not touching each other, in such a manner that the half of each shell overlaps the half of each preceding shell, forming thereby a concentric layer, substantially as set forth.

In testimony that I claim the foregoing as my invention I have signed my name in presence of two subscribing witnesses.

CHARLES BÜRGER.

Witnesses:
G. IMER,
L. H. MUNICRY.